Jan. 16, 1968  A. GODDARD  3,363,893
VEHICLE SUSPENSION DEVICE
Filed Jan. 25, 1966
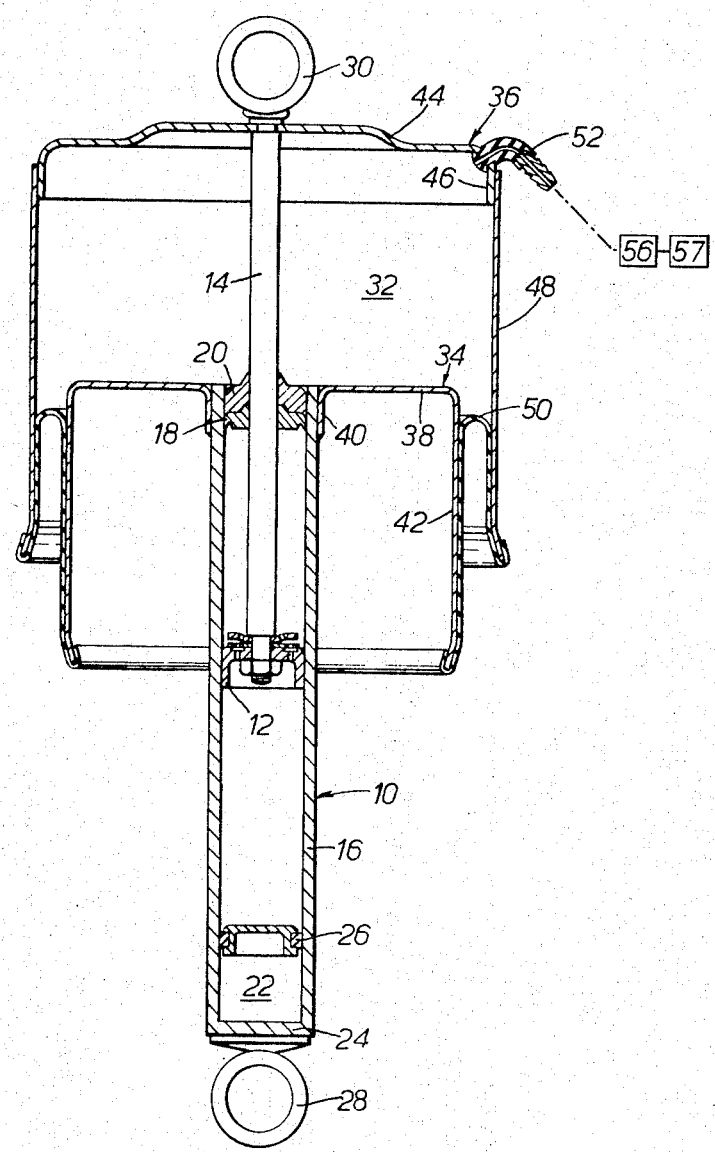

3,363,893
VEHICLE SUSPENSION DEVICE
Arthur Goddard, Birmingham, England, assignor to Girling Limited
Filed Jan. 25, 1966, Ser. No. 522,911
Claims priority, application Great Britain, Feb. 4, 1965, 4,870/65
4 Claims. (Cl. 267—64)

This invention relates to a vehicle suspension device. The device comprises a damper, for damping transient motion of unsprung parts of the vehicle with respect to sprung parts, with a variable volume chamber for applying a force between those parts of the vehicle. By varying the pressure of air in the chamber the relative positions of those parts of the vehicle can be corrected according to the vehicle load.

The invention provides, in or for a vehicle suspension, a suspension device comprising a telescopic damper including a cylinder and a piston rod extending therefrom and two telescopic members carried, respectively, by the cylinder and the piston rod, there being sealing means between the members to form a variable volume chamber, said sealing means being arranged to withstand external atmospheric pressure when the pressure within the chamber is sub-atmospheric, and connection means through which air can be withdrawn from the chamber to reduce the pressure below atmospheric and so to develop the force to correct the relative positions of the vehicle parts.

It has previously been proposed to provide a variable volume chamber to which air is supplied under pressure in order to raise the sprung part of the vehicle relative to the unsprung part, but this entails the provision of a supply of compressed air which is not normally available on vehicles such as motor vehicles. By means of the present invention however, it becomes possible to employ a source of reduced pressure, which may, for example, be constituted by the intake manifold of a motor car engine. It will, however, be within the scope of the invention to provide a vacuum pump or other extraneous source of reduced pressure.

Preferably each telescopic member is cylindrical and is secured at one end to the piston rod, or the cylinder as the case may be, the member secured to the piston rod being of greater diameter than the other member and there being a flexible diaphragm interconnecting the two members, the curved connecting portion of said diaphragm being convex towards the variable volume chamber.

With this arrangement, it becomes a simple matter to dimension the telescopic members so that their effective cross-sectional area is sufficient to transmit sufficient thrust, having regard to the reduced pressure available, and to ensure that the flexible diaphragm is spaced sufficiently far from the telescopic damper to avoid damage by the heat generated by the damper.

Other features and advantages of the invention will appear from the following description of an embodiment thereof, given by way of example in conjunction with the accompanying drawing the single figure of which is a sectional view of a suspension device in accordance with the invention.

In the suspension device, a telescopic hydraulic damper unit 10 has a valved piston 12 mounted on a piston rod 14, and sliding on a cylinder 16. The cylinder is partially filled with hydraulic fluid, and as the piston slides in the cylinder, the fluid flows through the piston under the control of the piston valves. A sealing arrangement 18 is provided where the piston rod enters an end plate 20 of the cylinder to prevent the damper fluid escaping from the cylinder. To accommodate displacement of the damper fluid caused by the piston rod entering and leaving the cylinder, a gas chamber 22 is provided at the end 24 of the cylinder remote from the end plate 20. Gas in the chamber 22 is separated from the damper fluid in the remainder of the cylinder by a free-sliding piston 26. Conventional mounting rings 28 and 30 are provided at the end 24 of the cylinder and at the free end of the piston rod 14 for attaching the cylinder to a wheel mounting of a vehicle and the piston rod to the vehicle chassis or frame in the usual manner.

A variable volume chamber 32 is formed between two cylindrical members 34 and 36. The member 34 has an annular plate portion 38 secured at its inner periphery to the end of the cylinder 16. The member 36 is secured to the free end of the piston rod 14.

A diaphragm 50 of a rubberised fabric is secured to the free ends of the members 34 and 36 for instance by bands (not shown) and is supported between the members to form a rolling seal. The diaphragm 50 is convex towards the chamber 32, so that when pressure is reduced in the chamber, the diaphragm is tensioned. A pipe connector 52 is provided on the member 36 for letting air into and out of the chamber 32.

The mean diameter of the two members 34, 36 is preferably about 7 inches.

When the device is mounted on the vehicle, connector 52 of the chamber 32 is connected through a control valve arrangement 56 to a suitable source of low pressure air such as the engine intake manifold 57. Alternatively a vacuum pump driven directly or indirectly by the vehicle engine could be used as the source of low pressure air.

In use, the piston rod 14 of the device is connected to the vehicle body and the damper cylinder 16 to the vehicle wheel. With the vehicle unladen, the static air pressure in the chamber 32 is maintained at about 0.280 kilogram per square centimetre (4 pounds per square inch). The maximum static pressure allowed in the chamber 32 under fully laden conditions is arranged so that the transient pressure in the chamber does not exceed atmospheric pressure at the bottom of an extreme bump stroke of the damper. Correction can be made for variations in the attitude of the vehicle caused by load variations on the wheel differing by about 68.2 kilograms (150 pounds) by allowing air into the chamber 32. In known arrangements using an air spring chamber (such as 32) the static pressure differential on the walls of the chamber has had to be as high as 7 kilograms per square centimetre (100 pounds per square inch) to accommodate a similar variation in loading with consequent impairment of the life of these suspension devices due to leakage of air at the joints of the devices.

Furthermore, since the rubberised diaphragm 50 is spaced from the damper unit 10 it is not heated by the damper unit in operation.

What I claim is:

1. A suspension device comprising a telescopic damper having a cylinder and a piston rod extending therefrom, two telescopic members carried, respectively, by said cylinder and said piston rod, sealing means between said members to form a variable volume chamber, said sealing means being arranged to withstand external atmospheric pressure when the pressure within said chamber is sub-atmospheric, a source of sub-atmospheric pressure, and connection means between said chamber and said source through which air can be withdrawn from said chamber to reduce the pressure within said chamber to a sub-atmospheric condition.

2. A suspension device as claimed in claim 1, wherein said telescopic members are each cylindrical, one being secured to said piston rod and being of larger diameter than one secured to said cylinder.

3. A suspension device as claimed in claim 2, wherein said sealing means is constituted by a flexible diaphragm secured to said respective telescopic members and having a curved connecting portion which is convex towards said chamber.

4. The combination of claim 1, wherein said source of sub-atmospheric pressure is constituted by an inlet manifold of an engine of said vehicle.

References Cited

UNITED STATES PATENTS

| 3,037,763 | 6/1962 | Steinhagen | 267—65 |
| 3,116,918 | 1/1964 | Francis | 267—65 |

ARTHUR L. LA POINT, *Primary Examiner.*

R. N. WOHLFARTH, *Assistant Examiner.*